(No Model.) 2 Sheets—Sheet 2.
F. G. JOHNSON.
PORTABLE RAILROAD SWITCH.
No. 393,985. Patented Dec. 4, 1888.
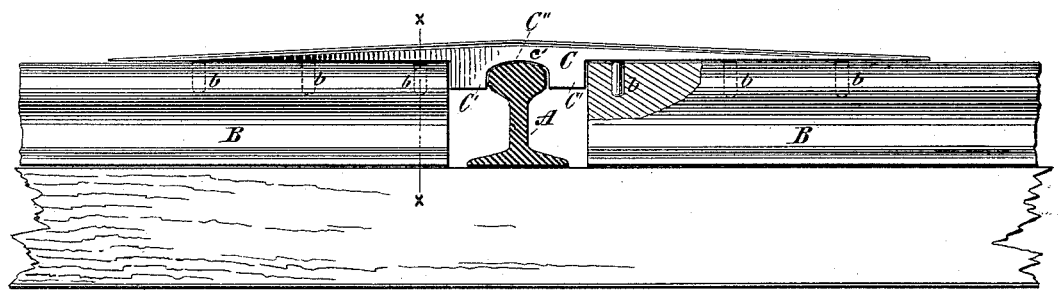
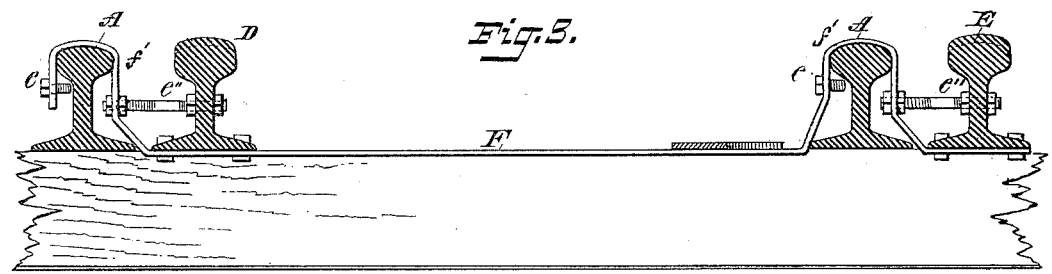
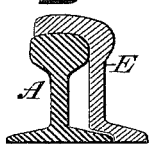 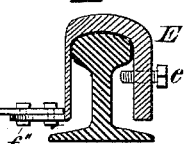 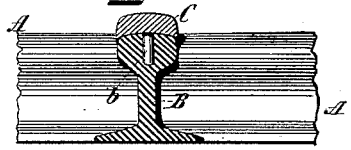
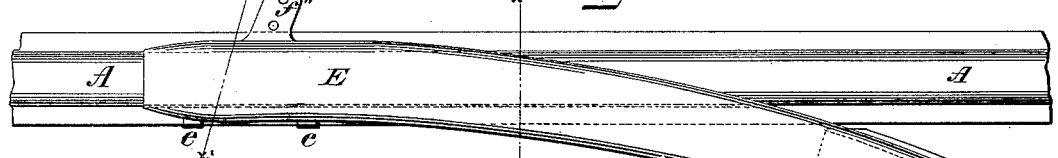
WITNESSES: Gustave Dieterich
Frank R. Johnson
INVENTOR. Frank G. Johnson

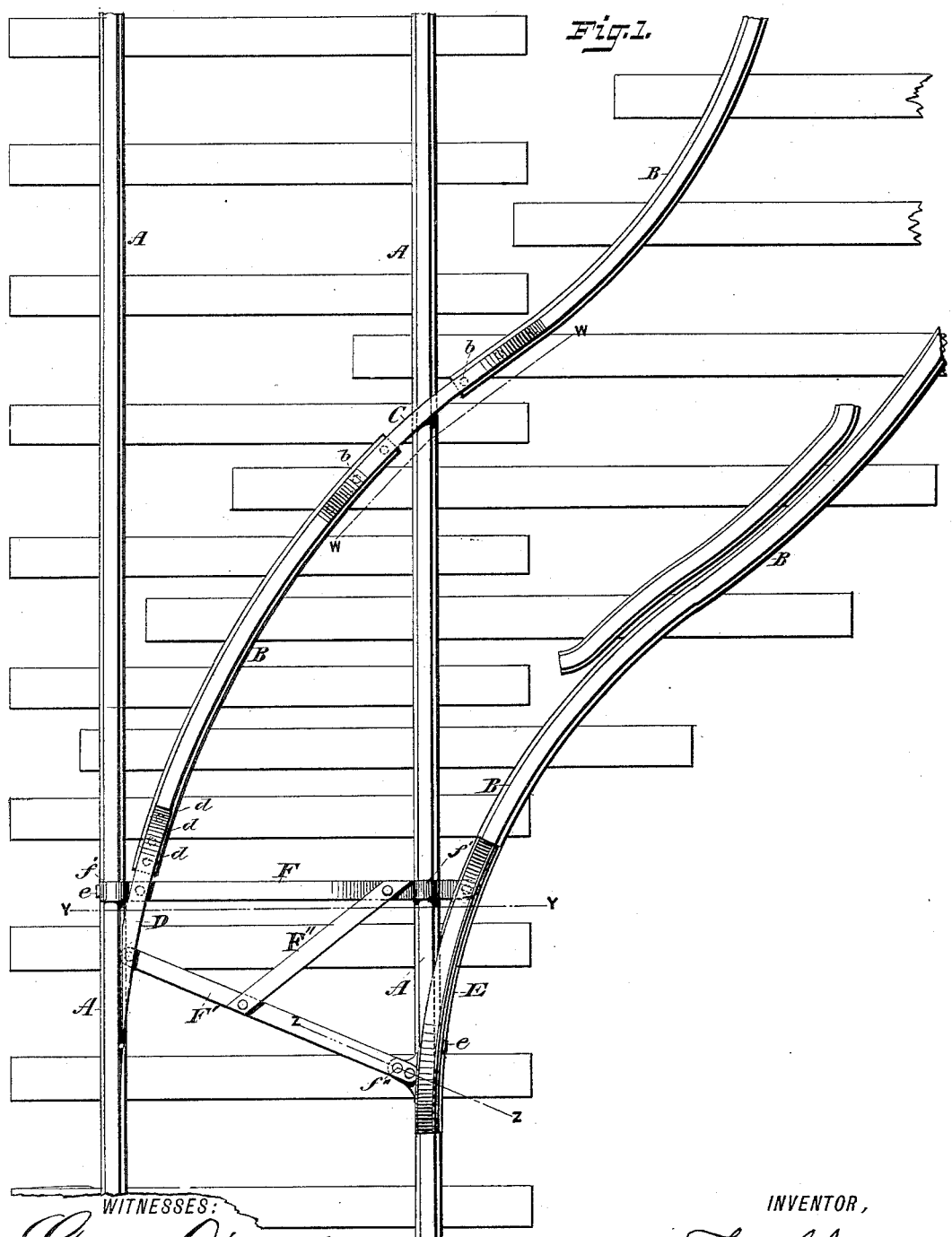

UNITED STATES PATENT OFFICE.

FRANK G. JOHNSON, OF NEW YORK, N. Y.

PORTABLE RAILROAD-SWITCH.

SPECIFICATION forming part of Letters Patent No. 393,985, dated December 4, 1888.

Application filed August 30, 1888. Serial No. 284,189. (No model.)

*To all whom it may concern:*

Be it known that I, FRANK G. JOHNSON, a citizen of the United States, residing in the city, county, and State of New York, have invented a new and useful Portable Railroad-Switch, of which the following is a specification.

It well known that "side tracks" of railroads are a great convenience to manufacturers and farmers, as such side tracks laid opposite and near to their lands and works save transportation therefrom to the nearest depot, which in many cases is miles away. As extensive farmers and manufacturers are willing to bear the expense of side tracks, they would be more generally employed except for the objections which railroad companies have to cutting their main track to put in local stationary switches. These objections are that such switches are expensive and in various ways greatly increase liability of destruction to rolling-stock and life of passengers.

The object, therefore, of my invention is to provide a portable switch which can be carried on a freight-train and handled by two men and laid down at any point on the main track wherever there may be a "siding" and without cutting or in any manner interfering with the main track, and yet serving the purpose equally as well as a stationary switch for switching or transferring cars from the main to the side track, and vice versa, which I accomplish by the device illustrated in the accompanying drawings, consisting of two sheets, in which—

Figure 1 is a ground plan showing a section of a main track of a railroad and a portion of a side track and the switching device; Fig. 2, a portable bridge-rail provided with pins to assist holding it in place on the track of the siding-rail seen along the line W W of Fig. 1; Fig. 3, a transverse section on the line $y\ y$ of Fig. 1, showing how the device is held on the main track; Fig. 4, a transverse section on the line $x\ x$ of Fig. 2, showing the shape of the bridge-rail and one of the pins that secure it to the siding-rail; Fig. 5, a longitudinal view of a part of the device where it bridges one of the rails of the main track, a portion of which is seen on the line $z\ z$ of Fig. 1; Fig. 6, a longitudinal downward view of Fig. 5; Fig. 7, a transverse view on the line $x'\ x'$ of Fig. 6; Fig. 8, a transverse section on the line $x''\ x''$ of Fig. 6.

Similar letters refer to similar parts throughout the several views.

A A A A is the unbroken or main track; B B B B, the side track, terminating adjacent to the main track within a few inches of the same, as seen in Fig. 1, and the rail (of the side track) adjacent to the main track being broken where it crosses the rail of the main track and the broken ends coming within a few inches of the adjacent rail of the main track, as seen in Figs. 1 and 2, these broken ends being laid on a level with the main track, as shown in Fig. 2, in which $C''$ represents a cross-section of the rail of the main track where it passes between these broken ends. C is a portable bridge-rail detached from the rest of my device, of the same width of the ordinary rail, longitudinally curved to correspond with the curve of the side track, B, at this place being transversely concave on the bottom to fit the top of the ordinary rail and transversely oval on the top like the top of a common rail, as shown in Fig. 4, provided with fixed pins on the lower side which fit into corresponding holes in the rail B to keep it (the bridge-rail) in position, the central portion being much the thickest vertically and growing thinner toward the ends, vanishing down to from a quarter to three-eighths of an inch thick, having the portion which comes between the said broken ends of the track B much thicker than any other part, and protruding as projections down between the said ends of the track B, (shown by $C'\ C'$, Fig. 1,) and in this thick section a transverse groove, $c'$, is cut out to fit the head $C'''$ of the rail A of the main track, as seen in same figure, which aids, in combination with the pins $b\ b\ b$, to secure this portable bridge-rail in its place.

The other and principal part of my device consists of the rigid frame D, F, F', and E, each part of which frame is differently made, and described as follows:

D (which for convenience we will term the "feathered switch-piece") is a short piece of steel casting which is feathered at one end and of ordinary rail shape at the other to butt up against the end of the rail of the side track, and at the big end it is made with an extension which bridges onto the end of the side track, and is provided with fixed pins $d\ d\ d$, that fit in corresponding holes, to aid in holding it in place.

E (which I will term the "switch bridge-piece") is a peculiarly-shaped piece of steel casting, being curved longitudinally to correspond with the curve of the side track, B. It rests at one end (on and near the line $x\ x$ of Fig. 6) on the main track A. At the other end it rests on the side track, B, and is provided at this end with two fixed pins, $g\ g$, Figs. 5 and 6, entering corresponding holes in the side track to aid in securing it thereto. It is oval on top like an ordinary rail. It vertically vanishes at either end to facilitate the receiving of the wheels of the cars, as seen in Fig. 5. It is concave on the bottom, where it bears upon the tracks, corresponding to the top of the same, and provided with lips on the sides to stride the rails and assist to keep the device in position. The lip on the end that rests on the main track is quite thin, as shown in Fig. 7, and vanishes toward the end, as shown in Fig. 8, in order to admit the flange of the car-wheel to pass along without crowding and binding the opposite wheel too firmly against the opposite rail. On the inside is provided a lug, $f''$, for bolting it to the cross brace or piece $F'$. (Seen in Fig. 1.)

F, Figs. 1 and 3, (which I will term the "fastening cross-bar,") is a flat bar of iron or steel, which serves the double purpose of firmly and rigidly uniting the feathered switch-piece D, and the switch bridge-piece E, and to give position and lateral security to both by means of its peculiar attachment to the main track, as best shown by Fig. 3, in which A A represent the main track, D the large end of the feathered piece, and E the outer end of the switch bridge-piece. This fastening cross-bar F is provided with two vertical bends, $f'\ f'$, Figs. 1 and 3, to pass over and fit onto the two rails of the main track A A, the upper portion of the bends being shaped to fit the top of the rails, as shown in Fig. 3. The two pieces of the switch, D and E, are firmly bolted at the bottom to this fastening cross-bar, as seen in same figure, and otherwise secured to the same by means of the lateral bolts $e''\ e''$, and the said cross-bar is furnished with set-bolts $e\ e$, which, after the switch is placed in position, are screwed up under the head of the rails of the main track A A, as seen in Fig. 3. Set-bolts are also employed in a similar manner for securing the inner end of the switch bridge-piece E, as seen in Figs. 1, 5, and 6.

F' is simply a flat piece of iron or steel fastened to the pieces D and E to hold them at a proper distance from each other and to hold them together, and $F''$ is a short brace of flat iron extending diagonally from F to F' and fastened thereto to stiffen and render the structure rigid.

Having described the various parts of my device, the explanation of its operation and use is briefly described as follows: The switch, as seen in Fig. 1, is laid and fastened in position for switching a car or cars off the main track or for running the same onto the main track from the side track. To remove the switch from the main track it is only necessary to turn back or unscrew the set-bolts $e\ e\ e\ e$ and lift it up, which can be done by two men. To remove the portable bridge-rail C, Figs. 1 and 2, it is only necessary to lift it up. To place the switch and the said bridge-rail, it is only necessary to reverse the above operation. Thus it is seen that the switch can be placed upon and removed from any part of the main track without in the least disturbing the same.

What I claim as new and useful, and desire to secure by Letters Patent, is—

1. In a portable railroad-switch, the bridge-rail C, Fig. 2, having the downward projections $C'\ C'$, transverse groove $c'$, and pins $b\ b\ b\ b$, in combination with the ends of the broken side-track rail B B, adjacent to the main track A A, whereby the wheels of a car can pass over the head $C''$ of the main-track rail A A, adjacent to the side track B B, substantially in the manner and for the purpose described.

2. In a portable railroad-switch, the fastening cross-bar F, having vertical bends $f'\ f'$ to pass over and fit onto the main-track rails A A, in combination with the feathered switch-piece D, switch bridge-piece E, and main track A A, substantially in the manner and for the purposes set forth.

3. In a portable railroad-switch, the peculiarly-formed bridge-piece E, having a thin lip on a portion of the inner side and thick lip on the outside, the pins $g\ g$, and set-bolts $e\ e$, in combination with the fastening cross-bar F, switch-piece D, main-track rails A A, and side-track rails B B, whereby cars can be turned from the main track A A to the side track B B and taken from the side to the main track at any place along the main track without cutting the same, substantially in the manner and for the purpose described.

FRANK G. JOHNSON.

Witnesses:
FRANK R. JOHNSON,
HUNTINGTON PAGE.